Patented Jan. 25, 1927.

1,615,247

UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS COMPOSITION.

No Drawing.  Application filed November 2, 1922. Serial No. 598,649.

I have discovered that the addition of certain salts, such as chlorides or bromides, to a non-lead glass of a relatively high silica content containing boric oxide, causes the otherwise transparent glass to become translucent as are the so-called opal glasses. This discovery therefore provides means for obtaining glasses of the last-named character without necessitating the use of fluorides, phosphates or alumina heretofore used for that purpose, although the desired result is not interfered with by the presence of the alumina or of other elements, such as lime, magnesia, zinc, lead, etc. The glass resulting from this invention is superior in many respects to the old fluoride or phosphate opals. The color does not strike as do the ordinary fluoride and phosphate opals and the glass can be repeatedly heated and cooled without appreciable change in color. The crystals are much larger and the filament of an electric lamp is not thereby changed in hue, and it is thus desirable for use in the manufacture of lighting fixtures as well as for other translucent ware for table or oven use.

In carrying out my invention I add to a proper boro-silicate foundation glass, or to a suitable batch therefor, a relatively small quantity of a compound containing a halogen whose atomic weight is over 34 and under 81, viz, chlorides or bromides, preferably, but not necessarily, of an alkali metal such as sodium, potassium or lithium. I find that for every 100 parts of foundation glass, or of batch therefor, 1 to 5% of the desired salt may be used to best advantage. Under certain conditions, larger or even smaller amounts may be used.

Generally speaking, the foundation glass to which the salt is added should contain over 70% silica and over 3% of boric oxide and a proper alkali (soda, potash and/or lithia) content, with or without other ingredients.

The following are examples of foundation glasses which I have successfully used:

|  | I. | II. | III. | IV. | V. | VI. | VII. | VIII. | IX. | X. | XI. | XII. |
|---|---|---|---|---|---|---|---|---|---|---|---|---|
| $SiO_2$ | 71½ | 75 | 75 | 75 | 78 | 80 | 80 | 80 | 76 | 85 | 85 | 90 |
| $B_2O_3$ | 22½ | 13 | 17 | 22 | 16 | 10 | 18 | 13½ | 12 | 10 | 7 | 3 |
| $Na_2O$ | 6 | 12 | 8 | 3 | 6 | 10 | 2 | 4½ | 8 | 5 | 8 | |
| $Al_2O_3$ | | | | | | | | 2 | | | | 2 |
| $Li_2O$ | | | | | | | | | | | | 5 |
| $CaO$ | | | | | | | | 4 | | | | |

Generally speaking, the alkali to boric oxide ratio is of importance, as glass containing more alkali than boric oxide does not give as good results as a glass having a higher relative percentage of boric oxide. In the above compositions $K_2O$ may be used to replace $Na_2O$ in whole, or in part, without affecting the invention. $Li_2O$ may be used in some cases, but if used exclusively or in excessive amount, often destroys the desired type of opacity. Other elements such as lime, magnesia, zinc, lead, etc.; as well as coloring oxides, may be introduced into these compositions in limited amounts, with beneficial effects on certain physical properties, such as stability and color, without seriously affecting the opacity. The opacity is, however, sensitive to changes in composition and may be destroyed by the use of too large quantities of elements other than silica and boric oxide. The amount of opacity is not dependent entirely on the amount of salts retained in the glass, as different base compositions tend to retain different amounts of salts. In the case of composition V above given, good depth of opacity is obtained in samples analyzing from 0.23% to 0.45% chlorine content, the amount retained depending on melting conditions and amount added. As the glasses giving good translucent effects with alkali are all of low specific gravity as are the alkali chlorides and bromides, the gravity of the glass may be an important factor in obtaining satisfactory results.

The silica of the foundation batch, if in the form of sand, should be ground to a fineness of 100 to 300 mesh to the square inch.

The term translucent is used in the claims hereunto appended as a generic expression to cover glasses of different degrees of opacity.

What I claim and desire to secure by Letters Patent is:—

1. The process of making a translucent glass comprising melting a batch free from substantial quantities of lead oxide containing at least 3% boric oxide, a relatively high percentage of silica and a salt containing a halogen whose atomic weight is over 34 and under 81 the batch and the resultant glass both being without other opacifying agents in substantial quantities.

2. The process of making a translucent glass, comprising melting a batch free from substantial quantities of lead oxide containing boric oxide, over 70% of silica and a salt containing a halogen whose atomic weight is over 34 and under 81 the batch and the resultant glass both being without other opacifying agents in substantial quantities.

3. The process of making a translucent glass, comprising melting a batch free from substantial quantities of lead oxide containing boric oxide, alkali, silica and a salt containing a halogen whose atomic weight is over 34 and under 81, the boric oxide content being not less than the alkali content, and the silica content being over 70% of the mixture other than the salt the batch and the resultant glass both being without other opacifying agents in substantial quantities.

4. The process of making a translucent glass, comprising melting a batch free from substantial quantities of lead oxide containing at least 3% boric oxide and a relatively high percentage of silica and a chloride salt the batch and the resultant glass both being without other opacifying agents in substantial quantities.

5. The process of making a translucent glass, comprising melting a batch free from substantial quantities of lead oxide containing boric oxide, over 70% of silica and a chloride salt the batch and the resultant glass both being without other opacifying agents in substantial quantities.

6. The process of making a translucent glass, comprising melting a batch free from substantial quantities of lead oxide containing boric oxide, alkali and silica and a chloride salt, the boric oxide content being not less than the alkali content, and the silica content being over 70% of the mixture other than the cholride salt the batch and the resultant glass both being without other opacifying agents in substantial quantities.

7. A glass containing over 70% silica, over 2% boric oxide and a compound containing a halogen whose atomic weight is over 34 and and under 81 and not containing other opacifying agents or lead in substantial quantities.

8. A glass containing over 70% silica, over 2% boric oxide and a chloride compound and not containing other opacifying agents or lead in substantial quantities.

9. A glass of a low specific gravity containing at least 3% of boric oxide and a compound of a halogen whose atomic weight is over 34 and under 81 and not containing other opacifying agents or lead in substantial quantities.

10. Process of making translucent glass comprising melting a batch substantially consisting of boric oxide, alkali, silica and a salt containing a halogen whose atomic weight is over thirty-four and under eighty-one.

11. The process of making translucent glass comprising melting a batch free from lead in substantial quantities and containing boric oxide, over 70% of silica in the form of a sand ground to one hundred mesh, or finer, and a salt containing a halogen whose atomic weight is over thirty-four and under eighty-one.

In testimony whereof I hereunto affix my signature.

WILLIAM CHITTENDEN TAYLOR.